T. L. GANEY.
FLUID GAGE.
APPLICATION FILED DEC. 18, 1911.
1,039,923.
Patented Oct. 1, 1912.
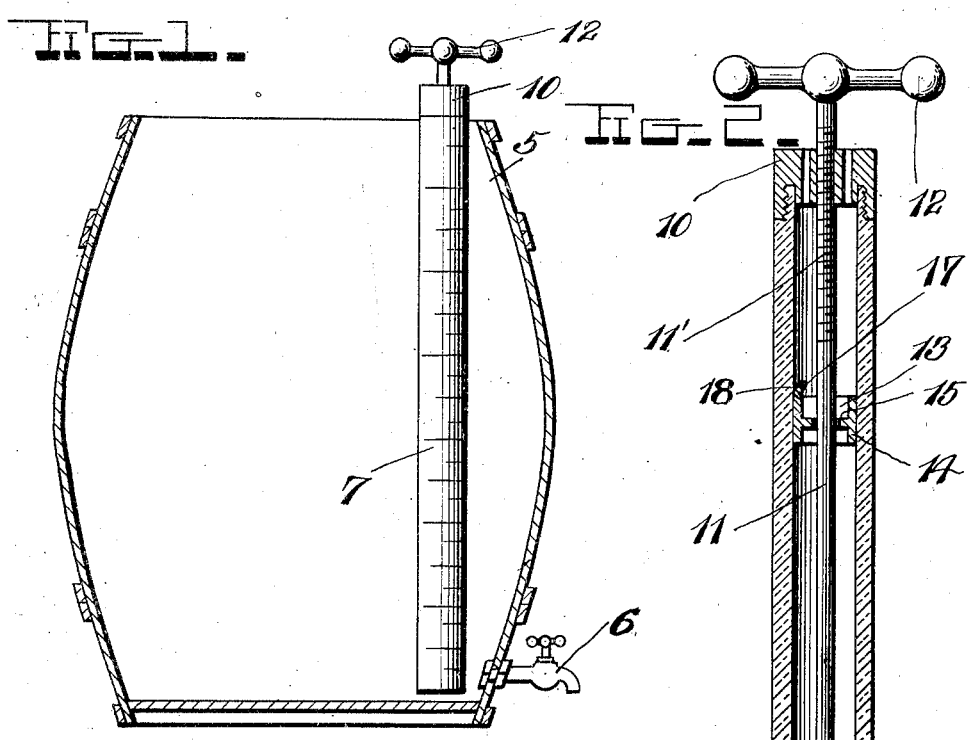
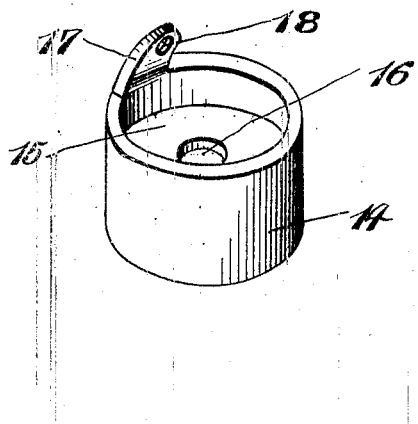
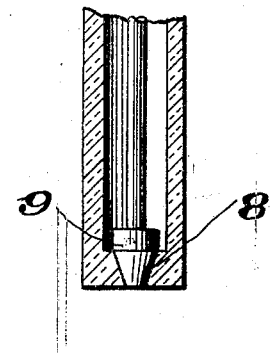
Witnesses
Chas. L. Griesbauer.
A. B. Norton.
Inventor
T. L. Ganey
By Watson E. Coleman
Attorney

UNITED STATES PATENT OFFICE.

THOMAS LEO GANEY, OF EAST ST. LOUIS, ILLINOIS.

FLUID-GAGE.

1,039,923.

Specification of Letters Patent.

Patented Oct. 1, 1912.

Application filed December 18, 1911. Serial No. 666,369.

*To all whom it may concern:*

Be it known that I, THOMAS LEO GANEY, a citizen of the United States, residing at East St. Louis, in the county of St. Clair and State of Illinois, have invented certain new and useful Improvements in Fluid-Gages, of which the following is a specification, reference being had to the accompanying drawings.

This invention relates to certain new and useful improvements in fluid gages and has for its object to provide a simple and efficient gage of this character for determining the depth of fluid or liquid in a barrel or other container.

Another object of the invention is to provide a gage of the above character which is adapted to be inserted within the barrel and removed therefrom after the liquid or fluid has entered the gage tube, said gage including a valve to close the lower end of the tube and retain the liquid therein when the gage is removed.

A still further object of the invention is to provide a simple and efficient fluid gage whereby the quantity of liquid within the vessel or container may be quickly ascertained.

With the above and other objects in view, the invention consists of the novel features of construction, combination and arrangement of parts hereinafter fully described and claimed, and illustrated in the accompanying drawings, in which—

Figure 1 is a vertical section through a barrel or other vessel showing my improved gage arranged therein; Fig. 2 is an enlarged longitudinal section of the gage; and Fig. 3 is a detail perspective view of the removable spider which is arranged within the gage tube.

Referring in detail to the drawing 5 designates a barrel or other vessel which is provided with a draw-off cock or faucet as shown at 6.

My improved gage includes a tube 7 of glass or other transparent material. This tube is provided in its lower end with a valve seat 8 for the reception of the conical valve head 9. Upon the other end of the gage tube 7 a cap 10 is removably engaged and is provided with a central screw threaded opening through which the threaded portion 11' of the valve stem or rod 11 is disposed. The upper end of the valve stem is provided with a suitable hand wheel 12 by means of which the same may be turned or rotated and the valve head lifted from its seat or engaged thereon.

In order to retain the valve stem centrally within the gage tube and prevent its relative lateral movement, I employ a spider 13 which is in the form of a short tube or sleeve 14 having a central horizontal web 15. This web is provided with a central aperture 16 through which the valve stem is loosely disposed for longitudinal movement. Upon one edge of the tube 14 a tongue 17 is formed and this tongue is inwardly disposed at an angle to the wall of the gage tube as clearly shown in Fig. 2. Said tongue is also provided with an aperture 18 which is adapted to receive a hook on the lower end of a wire or other tool which is adapted to be inserted into the gage tube, whereby the spider may be readily withdrawn from the tube. By providing this directing spider for the valve stem, pressure of the valve head 9 against the walls of the glass gage tube is effectually prevented so that the tube is relieved of strains in the movement of the valve. Owing to the length of the tube, it will be obvious that if any great strain devolved upon the walls thereof in the movement of the valve, the tube would be liable to breakage. Thus the durability of the device is materially enhanced. The outer surface of the glass gage tube is provided with the usual graduations indicated at 19 which designate the units of measure.

In the use of my improved gage, the same is inserted into the barrel or other vessel until the lower end of the tube engages the bottom thereof. The valve stem is now rotated to lift the valve head 9 from its seat so that the liquid may freely enter the glass tube. It will be observed that the valve head is of such form that the upper portion thereof is spaced from the walls of the tube so that the liquid may pass said valve head. It will of course be understood that in order to allow the liquid to enter the lower end of the tube, the stem is lifted slightly above the bottom surface of the vessel. After the tube has become filled with the liquid, the valve head 9 is adjusted to its seat and the gage then removed from the vessel. The depth of the liquid within the vessel may then be readily determined by simply observing the graduations upon the outer face of the gage tube with relation to the surface level of the liquid contained therein.

From the foregoing it is believed that the construction and manner of use of my improved gage will be fully understood.

The device is simple in construction and may therefore be manufactured at comparatively small cost. As the same is in no wise connected to the vessel in which the liquid is contained, the gage may be employed in the determination of the depth of liquid contained in numerous barrels or other containers. As soon as the gage has been read, the operator unseats the valve member and allows the liquid to drain back into the vessel. A device constructed in the manner above set forth admits of the easy and quick determination of the depth of the liquid. By removing the cap 10 and the guide member or spider 13 for the valve stem, the valve may be readily removed and the interior of the gage tube thoroughly cleansed in order to remove such sedimentary deposits as may accumulate upon the inner surface thereof and which if allowed to remain undisturbed would soon interfere with the reading of the gage.

While I have shown and described the preferred construction and arrangement of the various elements, it will be understood that the device is susceptible of considerable modification without departing from the essential feature or sacrificing any of the advantages thereof.

Having thus described the invention what is claimed is:—

A liquid gage comprising a transparent tube having a valve seat formed in one end, a valve member movable within the tube to engage said seat and provided with a stem extending through the tube and projecting beyond the other end thereof, a cap removably engaged on the latter end of said tube having a central threaded opening to receive a threaded portion of the valve stem, and a tubular guide member arranged within the tube and frictionally engaged with the walls thereof, said member being provided with a central horizontal web having an aperture therein through which the valve stem is loosely disposed for longitudinal movement, said tube also having an inwardly extending tongue formed on one edge and provided with an aperture to receive a suitable extracting tube.

In testimony whereof I hereunto affix my signature in the presence of two witnesses.

THOMAS LEO GANEY.

Witnesses:
C. W. JOHNSON,
T. J. SWEENEY.